3,042,687
Patented July 3, 1962

3,042,687
REACTION PRODUCTS OF EPOXIDISED OILS
Herbert Walter Chatfield, Croydon, and Geoffrey A. Weeks, Upminster, England, assignors to A. Boake, Roberts & Company Limited, London, England, a British company
No Drawing. Filed July 25, 1958, Ser. No. 750,857
6 Claims. (Cl. 260—348)

This invention relates to compounds obtainable by reaction of epoxidised oils with inorganic oxychlorides.

The term "epoxidised oils" as used in this specification is to be understood, in its broadest sense, as denoting in the first place drying, semi drying and non drying oils having an iodine value not less than about 80 in which the unsaturation has been partly or wholly removed by the formation of epoxy groups across double bonds, e.g. by treatment of the oil with hydrogen peroxide in presence of formic or acetic acids. In the second place the term "epoxidised oils" includes esters of monohydric and polyhydric alcohols other than the glycerol esters of the acids of the said oils which have been similarly converted into epoxy compounds.

According to the present invention new compositions of matter comprise reaction products of inorganic oxychlorides with epoxidised oils as above defined.

Suitable inorganic oxychlorides include phosphorus oxychloride, sulphuryl chloride, chromyl chloride, thionyl chloride and phosgene.

It has been proposed hitherto to react oxychlorides such as phosgene with ethylene oxide, but from such published information it would not be possible to predict the course of the reactions or the nature of the products which would be obtained by treating epoxidised oils with these inorganic oxychlorides.

The following examples illustrate the nature of the invention, the parts indicated being parts by weight:

Example 1

In this example, an epoxidised segregated sunflower seed oil of oxirane oxygen content 6.05% was used. This epoxide (100 parts) was stirred with phosphorus oxychloride (6.5 parts) and the mixture heated on a steam bath for 2 hours at 100° C. The resulting pale yellow viscous oil had an oxirane oxygen content of 4.03% and the final acidity was 0.33 N (i.e. 1 g. required 0.33 ml. of a Normal alkali solution for neutralisation).

Example 2

The epoxidised oil used in this example was the same as that used in Example 1; 100 parts of this epoxide were heated with phosphorusoxychloride (3.3 parts) for 1.3 hours at 100° C. After cooling, the reaction product was washed with dilute aqueous sodium carbonate until neutral (pH 7), and then several times with water. The product was dried by distilling away water under reduced pressure; the residual oxirane oxygen content was 3.13%.

Example 3

Fatty acids derived from ground nut oil were converted to the n-butyl esters and the resulting mixture was epoxidised to give a product having 3.86% of oxirane oxygen. This epoxyester (100 parts) was stirred with phosphorus oxychloride (0.7 part) for 2 hours at 100° C. The reaction mixture was treated by the method described under Example 2 and the oxirane oxygen content of the product was 2.47%.

Example 4

An epoxidised soya bean oil (oxirane oxygen content 6.20%; 100 parts) was dissolved in chloroform (150 parts) and thionyl chloride (7.2 parts) was added slowly. The mixture was boiled under reflux (liquid temperature about 83° C.) for 2 hours. The solvent was distilled away, final traces being removed by heating to 100° C. under reduced pressure in a steam of dry nitrogen. The dark brown product contained 3.51% of oxirane oxygen and the acidity was 0.02 N.

Example 5

The epoxidised oil described in Example 4 (100 parts) was dissolved in chloroform (150 parts) and boiled under reflux with sulphuryl chloride (8.2 parts). The product was isolated by the method described in the previous example, and the resulting clear yellow viscous oil contained 3.35% of oxirane oxygen and had an acidity of 0.05 N.

Example 6

The epoxidised oil described in Example 4 (132 parts) was mixed with a solution of phosgene (12.5 parts) in toluene (78 parts) in a stirred vessel surmounted with a condenser cooled with solid carbon dioxide. The mixture was heated slowly over 8 hours to 125° C. Toluene and any unreacted phosgene were removed by distilling under reduced pressure in a stream of nitrogen, leaving a pale yellow jelly.

Example 7

Epoxidised ground nut oil (100 parts by weight, oxirane oxygen content 4.61%) was dissolved in chloroform (592 parts by weight). Phosphoryl chloride (7.4 parts by weight) was added dropwise, and the mixture boiled under reflux. The chloroform was then removed by distillation. The product, which was a colourless mobile oil, having an oxirane oxygen content of 2.61%.

Example 8

Epoxidised n-butyl esters of ground nut oil fatty acids as described in Example 3 (100 parts) were dissolved in carbon tetrachloride (466 parts), and a solution of chromyl chloride (18.5 parts) in carbon tetrachloride (46.5 parts) was added dropwise with stirring. The temperature rose to 70° C. The carbon tetrachloride was distilled off, and the product, which was a green, viscous oil, had an oxirane oxygen content of 1.04%.

Example 9

Linseed oil fatty acids were esterified directly with ethylene glycol and the ester mixture epoxidised to give a product with an oxirane oxygen content of 5.86%. This epoxy ester (100 parts) was stirred with phosphorus oxychloride (4 parts) for 2 hours at 110° C. After cooling, the reaction product was washed with dilute aqueous sodium carbonate and then several times with water. The product was dried by distilling away water under reduced pressure; it had an oxirane oxygen content of 4.25%.

A variety of products may be prepared according to the invention for use in the adhesive, lubricant and rubber industries and also as plasticisers for synthetic resins such as polyvinyl chloride, depending upon the particular epoxidised oil and acid chloride chosen. Thus, for instance, reaction products of epoxidised oils with phosphorus oxychloride may be used for imparting flame retarding properties in epoxide based surface coatings and sulphuryl chloride condensates will provide a source of oil soluble sulphur derivatives.

We claim:
1. An oxirane compound containing internal oxirane oxygen consisting essentially of the reaction product of an epoxidized long chain fatty acid material selected from the group consisting of epoxidized drying oils, epoxidized semi-drying oils, epoxidized non-drying oils and the epoxidized mono and polyhydric alcohol esters thereof other than the glycerol esters of the acids of said oils and which said fatty acid material had an iodine value of not less than 80 before epoxidation, and an acid oxychloride selected from the group consisting of phosphorous oxychloride, sulfuryl chloride, chromyl chloride, thionyl chloride, and phosgene.

2. In the method of producing a long chain fatty aliphatic compound containing internal oxirane oxygen the steps of mixing a reactant acid oxychloride selected from the group consisting of phosphorous oxychloride, sulfuryl chloride, chromyl chloride, thionyl chloride, and phosgene with an epoxidized long chain fatty acid material selected from the group consisting of epoxidized drying oils, epoxidized semi-drying oils, epoxidized non-drying oils and the epoxidized mono and polyhydric alcohol esters of the acids thereof other than the glycerol esters of the acids of said oils and which said fatty acid material had an iodine value of not less than 80 before epoxidation, heating the said mixture and effecting the production of said oxirane compound.

3. The process of claim 2 wherein, the mixture is contained in a mutual solvent for said mixture and the reaction is effected under solvent reflux conditions.

4. The process of claim 2 wherein, the acid oxychloride is selected from the group consisting of phosphorous oxychloride, sulfuryl chloride, chromyl chloride, thionyl chloride and phosgene and the mixture is heated to a temperature between about 70° C. and about 125° C.

5. The process of claim 2 wherein, the mixture comprises a said acid oxychloride and epoxidized soybean oil the unsaturation of which has been at least partly removed by the formation of epoxy groups across double bonds in the said oil.

6. The process of claim 2 wherein, the mixture comprises a said acid oxychloride and an epoxidized ester of linseed oil fatty acid the unsaturation of which has been at least partly removed by the formation of epoxy groups across double bonds in the said oil.

References Cited in the file of this patent
UNITED STATES PATENTS

| | | |
|---|---|---|
| 1,936,985 | Lommel | Nov. 28, 1933 |
| 2,576,138 | Pechukas | Nov. 27, 1951 |

OTHER REFERENCES

Malinovsky: Chem. Abstracts 42:2229[a] (1948).
Tachimeri: Chem. Abstracts, 42:6319[1] (1948).
Malinovsky: Chem. Abstracts, 48:2580[b] (1954).
Malinovsky, Chem. Abstracts, 48:609[1] (1954).
Jones: Chem. Abst., vol. 51, pages 16433–16434 (1957).